United States Patent
Nanbu et al.

[11] Patent Number: 6,156,075
[45] Date of Patent: Dec. 5, 2000

[54] METAL CHELATE FORMING FIBER, PROCESS FOR PREPARING THE SAME, AND METHOD OF METAL ION SEQUESTRATION USING SAID FIBER

[75] Inventors: Nobuyoshi Nanbu; Osamu Ito, both of Yokkaichi; Koujirou Nagatsuka, Higashimurayama, all of Japan

[73] Assignees: Chelest Corporation; Chubu Chelest Co., Ltd., both of Osaka-fu, Japan

[21] Appl. No.: 09/284,636

[22] PCT Filed: Oct. 13, 1997

[86] PCT No.: PCT/JP97/03669

§ 371 Date: Apr. 15, 1999

§ 102(e) Date: Apr. 15, 1999

[87] PCT Pub. No.: WO98/16680

PCT Pub. Date: Apr. 23, 1998

[30] Foreign Application Priority Data

Oct. 15, 1996 [JP] Japan .................................. 8-272707
Oct. 1, 1997 [JP] Japan .................................. 9-268868

[51] Int. Cl.[7] .......................... C08F 8/30; D06M 13/322; D06M 13/00
[52] U.S. Cl. .................. 8/196; 8/181; 8/115.54; 8/115.65; 8/115.66; 8/120; 428/366
[58] Field of Search .......................... 8/181, 196, 115.54, 8/115.65, 120, 115.66; 428/366

[56] References Cited

U.S. PATENT DOCUMENTS 5,672,418  9/1997  Hansen et al. .

FOREIGN PATENT DOCUMENTS 5057280  3/1993  Japan .
5057281  3/1993  Japan .
5111685  5/1993  Japan .
7-10925  1/1995  Japan .
9248570  9/1997  Japan .

*Primary Examiner*—Margaret Einsmann
*Attorney, Agent, or Firm*—Smith Patent Office

[57] ABSTRACT

The present invention provides a metal chelate forming fiber in which a reactive functional group in a molecule in the surface of the fiber is substituted with an acyl group represented by the following formula [1]:

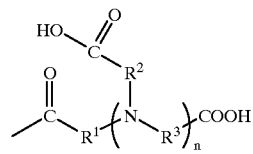

(where $R^1$, $R^2$, and $R^3$ respectively are a lower alkylene group, and n is an integer of 1 to 4.) The present also provides a method for preparing the fiber, and a process for treating waste water using the fiber where metal ions contained in the waste water are allowed to be captured by the acyl group.

13 Claims, 4 Drawing Sheets

METAL CHELATE FORMING FIBER, PROCESS FOR PREPARING THE SAME, AND METHOD OF METAL ION SEQUESTRATION USING SAID FIBER

TECHNICAL FIELD

The present invention relates to a novel metal chelate forming fiber, a process for preparing the same, and a method of metal ion sequestration using the fiber. The metal chelate forming fiber is capable of selectively adsorbing metal ions present in a slight amount in water such as copper, zinc, nickel, and cobalt with high efficiency even at low pH. The metal chelate forming fiber is usable in wide application including purification of waste water discharged from factories and purification of drinking water.

BACKGROUND ART

There are some cases where industrial waste water contains various harmful metal ions. In order to prevent environmental pollution, it is required to sufficiently remove such harmful metal ions from the industrial waste water. On the other hand, many of the harmful metal ions can be effectively used as heavy metals. If, therefore, such harmful metal ions can be separated and collected to be recycled as secondary resources, two advantages of harmful metal ion removal and its recycling are attained simultaneously.

Conventionally, ion-exchange resins have been widely used for removing harmful metal ions or capturing valuable metal ions from industrial waste water. However, conventional ion-exchange resins do not have sufficient ability of selectively adsorbing low metal ion concentration.

Chelating resins also have been used for removing or capturing heavy metals in water treatments. Chelating resins form a chelate with metal ions to selectively capture them. Its ability of capturing metal ions, and especially heavy metal ions, is high. However, many of chelating resins have iminodiaceticacid skeleton introduced therein. This skeleton tends to lower the chelate formation ability of the chelating resins, in particular, the selective adsorption ability thereof at low pH.

Normally, ion-exchange resins and chelating resins are in the form of beads with a rigid three-dimensional structure formed by crosslinking using a cross-linking agent such as divinylbenzene and the like. This structure lowers the diffusion speed of metal ions and regenerants into the ion-exchange resins and the chelating resins and as a result, processing efficiency is lowered. Furthermore, when these resins are of the disposable type which are thrown away after one use without being recycled, it is difficult to burn and dispose them. In this case, there is a problem of how to decrease the volume of the used resins.

In an attempt to solve the problems of the bead-like chelating resins, a fiber-like or sheet-like chelating resin has been proposed (see Japanese Unexamined Patent Publication No. 7-10925). The fiber-like or sheet-like chelating resin has a large specific surface area, and contains on its surface, a chelate functional group which is to be the site of adsorbing and desorbing metal ions. Due to these characteristics, the resin has many advantages, for example, it shows high efficiency of adsorbing and desorbing metal ions, and can be easily burned and disposed. However, there are also disadvantages that the production process thereof is complicated, and the use of an ionizing ray is required in its production. As a result, there are many problems in terms of equipment, safety, and production cost.

The present invention has been achieved in view of the above-described situation, and an objective thereof is to provide a metal chelate forming fiber which can be made by a simple and safe method at low cost, a process for preparing the same, and a metal ion sequestration using the fiber.

DISCLOSURE OF INVENTION

According to the present invention, a chelate forming fiber contains an acyl group represented by the following formula (1) as a substituent group in at least a molecule present on the surface of the fiber:

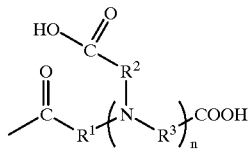

(1)

(where $R^1$, $R^2$, and $R^3$ respectively are a lower alkylene group, and n is an integer of 1 to 4.)

According to the present invention, a hydroxyl group and an amino group are typical examples of the reactive functional group contained in the molecule which constitutes the fiber. In carrying out the present invention, higher ability of capturing metal ions can be imparted to the metal chelate forming fiber by controlling the substitution rate of the acyl group obtained from the following mathematical expression to 10 weight percent or more:

Substitution rate (weight percent)=[(weight of fiber after reaction—weight of fiber before reaction)/weight of fiber before reaction]×100

Preferable examples of the acyl group represented by the formula (1) include residues of nitrilotriacetic acid, ethylenediamine tetraacetic acid, and diethylenetriamine tetraacetic acid. These may be introduced into the molecule of the fiber alone or in combination of two or more of them.

According to the metal ion sequestration of the present invention, metal ions (i.e. harmful heavy metal ions and valuable metal ions) contained in water are captured by using the above-described metal chelate forming fiber. According to the production method of the present invention, the above-described chelate forming fiber can be prepared in a simple manner with high efficiency. In this method, an anhydride of polycarboxylic acid represented by the following formula (2) is reacted directly with a reactive functional group of the molecule constituting the fiber, or another reactive functional group which has been introduced into the molecule constituting the fiber:

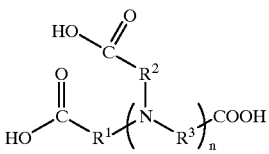

(2)

(where $R^1$, $R^2$ and $R^3$ respectively are a lower alkylene group (and more preferably, an alkylene group having 1 to 3 carbon atoms), and n is an integer of 1 to 4.)

Preferable examples of an anhydride of polycarboxylic acid used to carry out the production method of the present invention include nitrilotriacetic anhydride, ethylenediamine tetraacetic dianhydride, and diethylenetriamine pentaacetic dianhydride. These may be used alone, and if necessary, in combination of two or more of them.

BEST MODE FOR CARRYING OUT THE INVENTION

Figure 1:
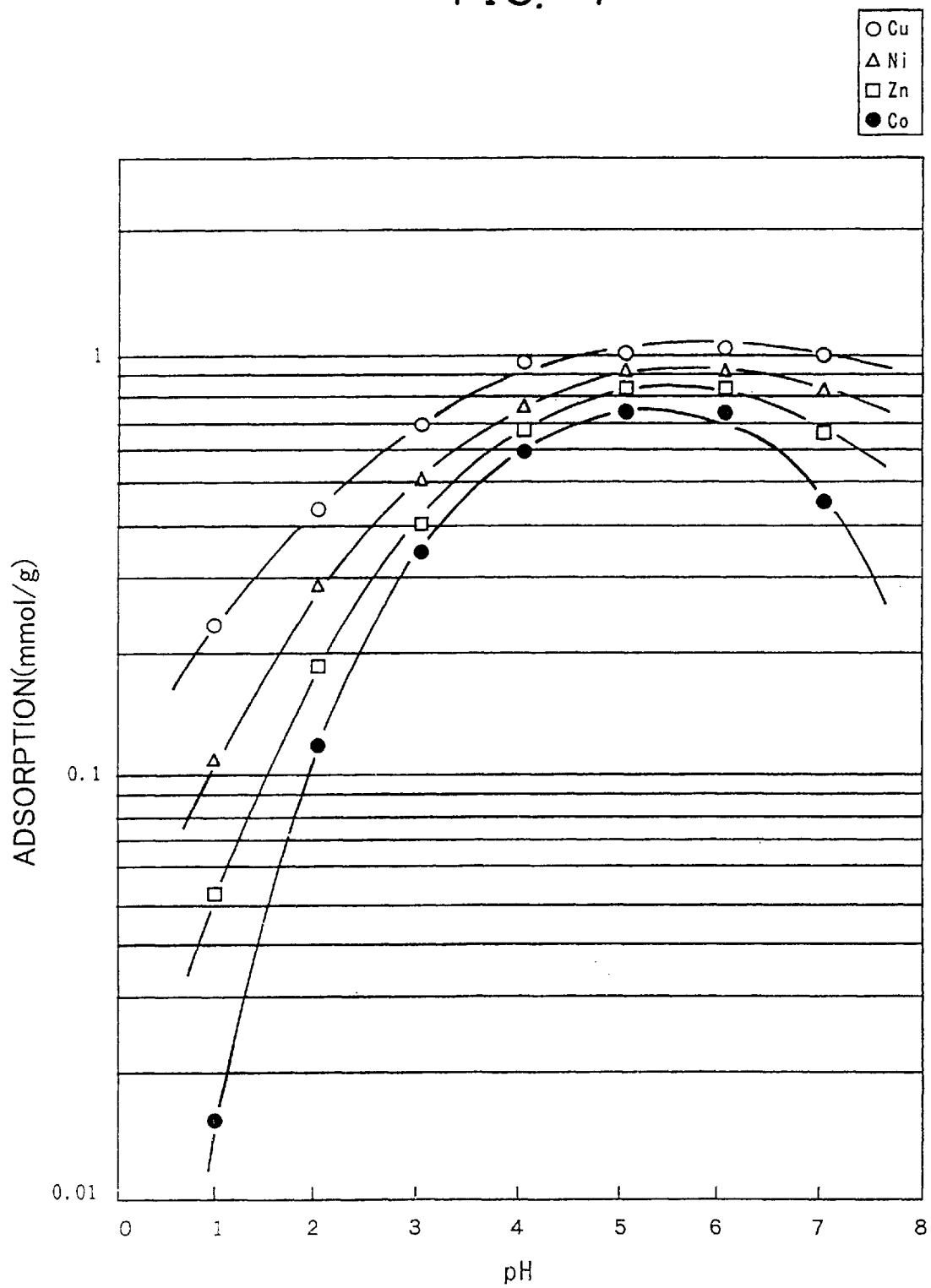
FIG. 1 is a graph illustrating the results of the adsorption test using a metal chelate forming fiber according to an example of the present invention.

According to the present invention, the metal chelate forming fiber contains an acyl group represented by the formula (1) as a substituent group in the molecule present on the surface of the fiber. The acyl group contains nitrogen and a carboxylic acid which have an excellent ability of selectively adsorbing heavy metal ions such as copper, zinc, nickel, and cobalt. The acyl groups with a selective adsorption ability is exposed on the surface of the fiber. Due to the presence of the acyl group, the fiber shows high ability of selectively adsorbing metal ions.

As the reactive functional group into which the acyl group is introduced, a functional group having reactivity with the an anhydride of polycarboxylic acid represented by the above-mentioned formula (2) is used. Examples of the reactive functional group include hydroxyl groups, amino groups, imino groups, thiol groups, glycidyl groups, isocyanate groups, and aziridinyl groups. There is no specific limitation on the material of fiber having the reactive functional group, and various fiber may be used. Examples of the fiber include: various plant fibers including cotton and hemp; various animal fibers including silk and wool; various synthetic fibers including polyamide, acryl, and polyester fibers; and regenerated fibers including viscose and acetate fibers. In many cases, these fibers have a reactive functional group such as a hydroxyl group and an amino group in their molecules, and the reactive functional group can be utilized as it is. In the case, however, where a fiber having no reactive functional group such as described above in its molecule is used, another reactive functional group is introduced into the molecule of the fiber by any method such as oxidization. If necessary, it is also possible that the reactive functional group which is originally had in the molecule of the fiber is derived into a functional group with higher activity, and thus-obtained fiber is used.

There is no limitation on the form of fiber. The fiber may be a long-fiber multifilament, a short-fiber spun yarn, or a cloth obtained by weaving or knitting them, and further may be a non-woven fabric. It is also effective to use woven or knitted fabrics obtained by combining two or more of fibers. Also usable are wood, pulp, paper, as well as wood pieces, wood chips, and laminates.

The fiber having the reactive functional group in its molecule is reacted with the an anhydride of polycarboxylic acid represented by the formula (2). As a result of this reaction, the acyl group represented by the formula (1) is introduced into the molecule of the fiber so as to be pendant on the molecule. The carboxylic acid included in the acyl group has high chelate reactivity with heavy metal ions. Accordingly, fibers introduced with the acyl group, when being used to treat waste water containing heavy metal ions, capture heavy metal ions in the waste water owing to efficient formation of metal chelate.

Preferable examples of the an anhydride of polycarboxylic acid represented by the formula (2) used for the introduction of the acyl group represented by the formula [1] include nitrilotriacetic anhydride (NTA anhydride), ethylenediamine tetraacetic dianhydride (EDTA dianhydride), ethylenediamine tetraacetic monohydride (EDTA monoanhydride), diethylenetriamine pentaacetic dianhydride (DTPA dianhydride), and diethylenetriamine pentaacetic monoanhydride (DTPA monoanhydride). Among them, especially preferable are nitrilotriacetic (NTA) anhydride, ethylenediamine tetraacetic (EDTA) monoanhydride, and diethylenetriamine pentaacetic (DTPA) monoanhydride.

The anhydride and the fiber having the reactive functional group in its molecule are reacted with each other in a polar solvent such as N, N'-dmethylformamide and dimethylsulfoxide at, for example, about 60 to 100° C. for 30 minutes to several hours. In this reaction, the anhydride group reacts with the reactive functional group (for example, a hydroxyl group and an amino group) had in the molecule of the fiber, and they bond with each other. As a result, the acyl group represented by the formula (1) is introduced into the fiber to assume the shape of pendant. Thus-obtained fiber has high ability of selectively adsorbing metal ions.

Preferable examples of the acyl group represented by the formula (1) include residues of nitrilotriacetic acid (NTA), etylenediamine tetraacetic acid (EDTA), and diethylenetriamine pentaacetic acid (DTPA). The residues may be introduced into the molecule of the fiber alone, or in combination of two more of them.

In the case where the fiber does not have the reactive functional group in its molecule, the fiber is subjected to any treatment such as oxidization or graft polymerization for introducing the reactive functional group. Then, the fiber is reacted with the an anhydride of polycarboxylic acid. In the case where the fiber has the reactive functional group but its reactivity with the an anhyhdride of polycarboxylic acid is low, it is effective that a reactive functional group with high reactivity is introduced into the fiber, and then, the fiber is reacted with the polycarboxylic anhydride.

As a result, the metal chelate forming fiber of the present invention is prepared. The amount of the acyl group to be introduced into the fiber can be properly controlled in accordance with the amount of the an anhydride of polycarboxylic acid to be used in introducing the acyl group into the fiber and the conditions of the introduction reaction. In order to give a sufficient ability of capturing heavy metals to the fiber, it is preferable that the substitution rate of the an anhydride of polycarboxylic acid obtained from the above-mentioned mathematical expression is controlled to 10 weight percent or more, and more preferably 20 weight percent or more. The upper limit of the substitution rate is not specifically restricted. The higher the substitution rate is, the higher the crystallinity of the fiber becomes higher. The fiber is liable to be fragile. In view of economical efficiency, accordingly, the upper limit of the substitution rate is recommended to be 100 weight percent or lower, preferably 50 weight percent or lower. However, depending on the kind of reactive functional group in the molecule of the fiber and the introduction amount of the acyl group, the substitution rate as high as 100 to 200 weight percent can be exceptionally employed. For some applications, the fiber which has the acyl group with extremely high substitution rate and therefore has extremely high ability of capturing metal ions is very useful.

The reaction for introducing the acyl group is schematically represented by the following chemical formula, taking the case where the fiber is cotton or silk and ethylenediamine tetraacetic dianhydride is reacted with the fiber as an example:

(in the case of cotton)

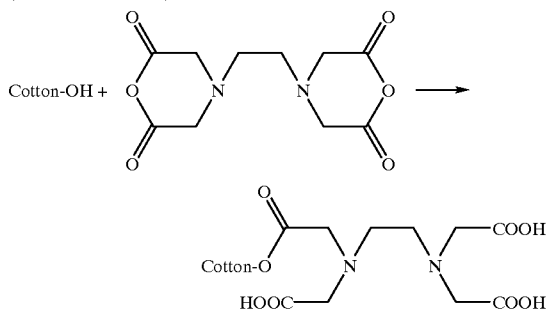

(in the case of silk)

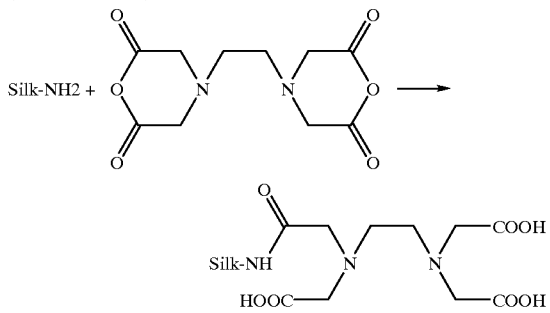

The above chemical formula show, as a typical example, the case where the hydroxyl group or the amino group contained in the molecule of the fiber is reacted with the an anhydride of polycarboxylic acid. The same chemical formulae are applicable to the case where the acyl group is introduced into the fiber using a reactive functional group such as=NH, —SH or other reactive functional groups.

As described above, according to the present invention, the acyl group represented by the formula (1) is introduced into the molecule of the fiber. As will be clarified in Examples later, thus-obtained fiber shows high ability of selectively adsorbing heavy metal ions and has an enhanced effect of capturing heavy metal at neutral pH as a matter of course and even at low pH, and also in the case where the fiber is used for treating waste water having low metal ion concentration.

When the metals adsorbed and captured by the metal chelate forming fiber of the present invention are treated in an aqueous solution of strong acid such as hydrochloric acid and sulfuric acid, the metals can be easily separated from the carboxylic group contained in the acyl group. By taking advantage of this characteristic, the metals can be easily regenerated. If necessary, the metals can be collected from a regenerated liquid as useful metals.

Examples of the metals to be captured by the metal chelate forming fiber of the present invention include copper, nickel, cobalt, zinc, calcium, magnesium, iron, scandium and yttrium which are rare earth elements, lanthanium, cerium, praseodymium, neodymium, samarium, europium, gadolinium, dysprosium, holmium, erbium, and ytterbium which belong to lanthanoide series, and in addition, technetium, promethium, francium, radium, uranium, plutonium, and cecium which are radioactive elements.

The metal chelate forming fiber is widely usable in various applications as follows: purification of various liquid materials (for example, purification of hydrogen peroxide solution, purification of materials containing a surface active agent, preparation of pure water, quality stabilization of rice wine, and purification of water soluble dye bath); removal or capture and collection of metals from various liquids (for example, removal of harmful metals from waste water such as that discharged in the fiber scouring process, sequestration and collection of valuable metals from waste water, various reaction liquids, and sea water. More specifically, collection and purification of tin from a chemical copper plating bath, separation or capture of rare metals from natural water, and separation, collection, and purification of valuable metals from ore treated water). The fiber is also usable in other applications than the above. For example, the fiber is made to capture a metal having catalytic activity such as iron, and is used as a redox reagent (i.e. a catalyst for removing $No_x$ and $So_x$). It is also possible that the fiber is made to capture an antibacterial or antiseptic metal such as copper, silver, and nickel, and is as an antibacterial or antiseptic fiber.

EXAMPLES

Hereinafter, the present invention will be further described in detail with reference to examples. However, it is to be noted that various changes and modifications will be apparent to those skilled in the art. Therefore, unless otherwise such change and modifications depart from the scope of the invention, they should be construed as being included therein.

Example 1
(In the case of producing a cotton-EDTA type chelate forming fiber)

Into 200 ml of N, N-dimethylformaldehyde, 35.3 g of ethylenediamine tetraacetic dianhydride was added and dissolved through the application of heat at 80° C. Into thus-obtained liquid solution, 0.4 g of cotton cloth (unbleached cotton knit) was soaked and heated at 80° C. for 6 hours. Next, the cotton cloth was soaked into 500 ml of distilled water. In this state, pH of the distilled water was adjusted to about 10 using ammonium water, and the water was stirred for 3 hours to dissolve and remove the unreacted ethylenediamine tetraacetic acid. Then, the cotton cloth was soaked into 500 ml of 0.1 normal sulfuric acid aqueous solution and was stirred for 3 hours. After that, the cotton cloth was repeatedly washed with distilled water until the washing distilled water was neutralized, and then was dried at 60° C. for 5 hours. As a result, 0.54 g of cotton-EDTA type chelate forming fiber was obtained (substitution rate: 35 weight percent).

The cotton-EDTA type chelate forming fiber was cut to obtain four pieces of 0.05 g in weight. The respective pieces were made to contain copper, zinc, nickel, and cobalt having concentration of about 1 mmole/liter, and were then soaked into 50 ml of dilute sulfuric acid aqueous solution having pH adjusted to 1 to 7 and stirred at 20° C. for 20 hours. For the respective pieces, the adsorption of each metal ion was checked. As is seen in FIG. 1, the pieces showed high ability of adsorbing the respective metal ions, i.e. copper, zinc, nickel, and cobalt at neutral pH as a matter of course, and even at low pH. From the test results shown in FIG. 1, it is revealed that the adsorption activity of the fiber varies depending on the kinds of metal ions. Specifically, the fiber had the highest adsorption activity for copper, and its adsorption activity becomes successively lower from nickel, zinc, to cobalt in this order. The difference in the adsorption activity may be positively utilized. For example, the fiber is made to capture copper first, and then, to sequentially capture nickel, zinc, and cobalt in this order. The metal ions dissolved in a liquid can be captured in such a manner that they are sorted out in the order from high to low adsorption activity of the fiber.

Example 2
(in the case of producing a cotton-NTA type chelate forming fiber)

Figure 2:
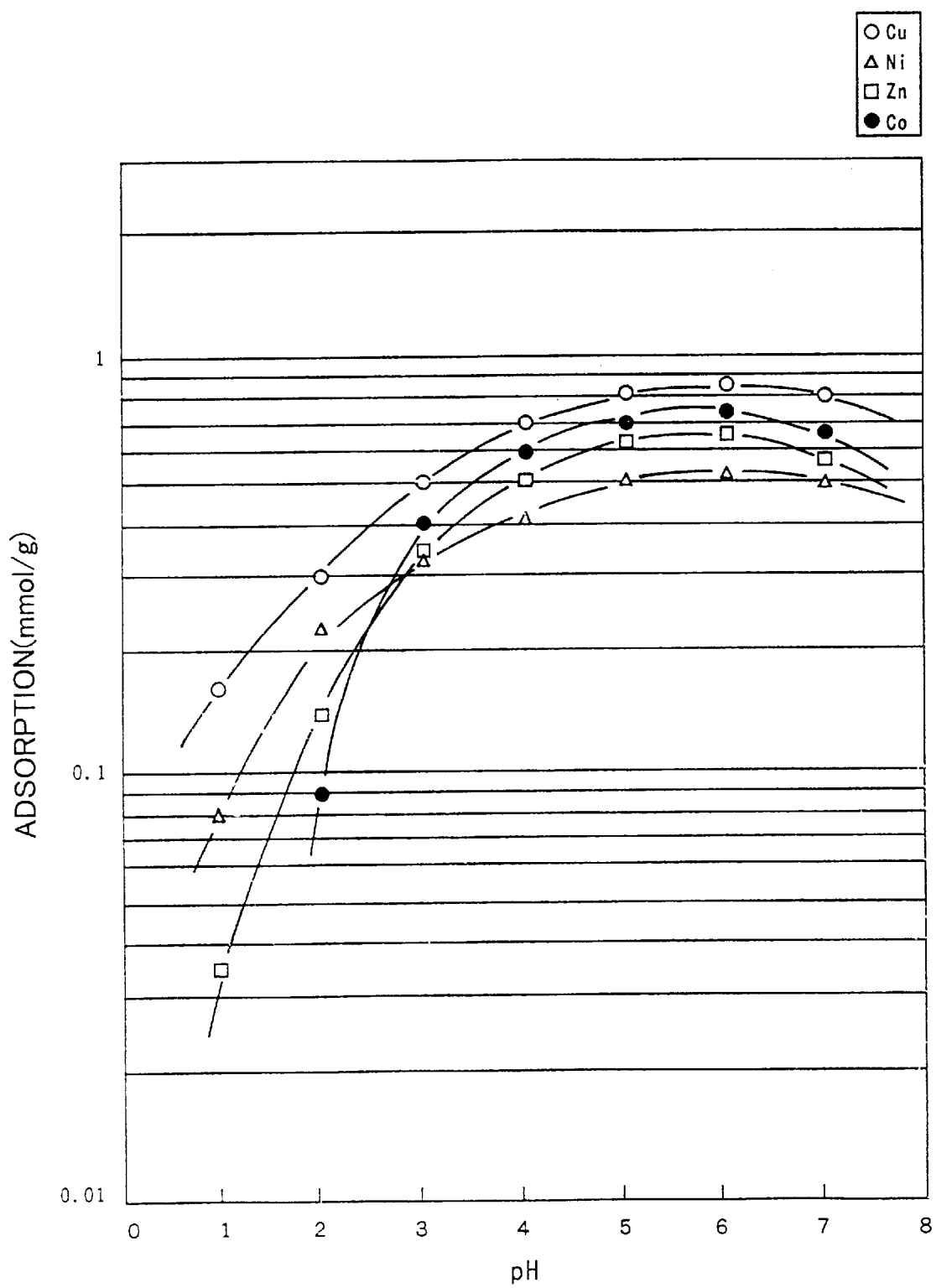
FIG. 2 is a graph illustrating the results of the adsorption test using a metal chelate forming resin according to another example of the present invention.

The steps of Example 1 were repeated to obtain 0.51g of a cotton-NTA type chelate forming fiber (substitution rate: 28 weight percent), except that 35.3 g of nitrilotriacetic anhydride was used instead of ethylenediamine tetraacetic dianhydride, and 0.4 g of cotton cloth (unbleached cotton knit) was used. Through the use of the cotton-NTA chelate forming fiber, the same adsorption test as that conducted in Example 1 was conducted. The results of the test are shown in FIG. 2.

Comparative Example 1

Figure 3:
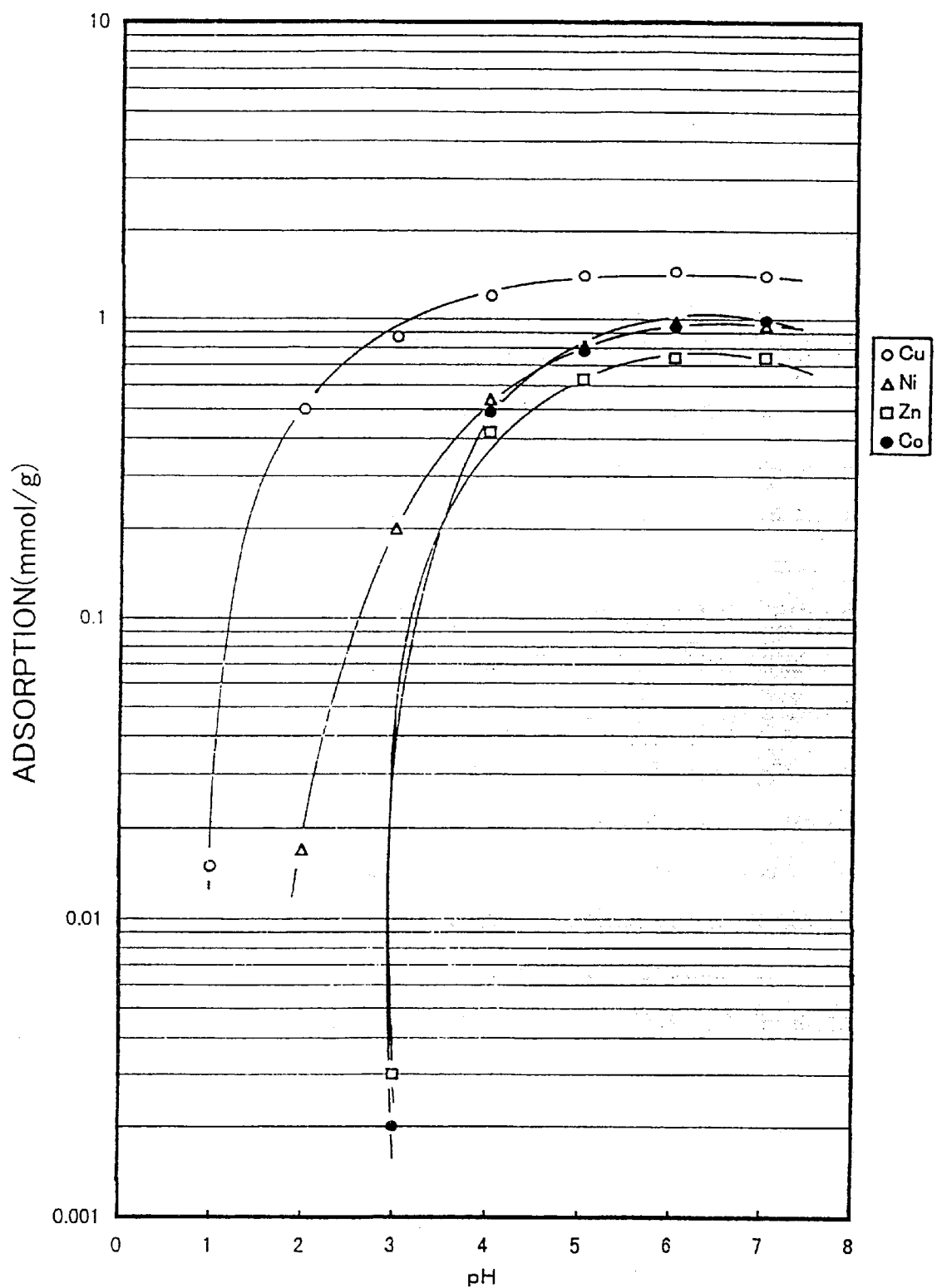
FIG. 3 is a graph illustrating the adsorption test using a conventional bead-like metal chelate forming resin.

The same adsorption test as that conducted in Example 1 was conducted, except that a bead-like styrene-iminodiacetic acid chelating resin ("Diaion CR11", a product of Mitsubishi Kagaku Co., Ltd.). As known from the results shown in FIG. 3, the fiber had relatively good adsorption for the copper ions at pH of about 2. However, pH of about 3 to 4 was required to adsorb the nickel, zinc, and cobalt. From this result, it is found that the fiber has high pH dependency.

Example 3

A piece of 4 g in weight of the cotton-EDTA type chelate forming fiber prepared in Example 1 and a piece of 4 g in weight of the bead-like styrene-iminodiacetic acid chelating resin used in Comparative Example 1 were respectively put into a glass column having a diameter of 10 mm. Into the respective columns, an aqueous solution containing copper sulfate with a concentration of 10 mmol/liter was allowed to flow at a speed of SV=10 hr$^{-1}$. The concentration of copper ion contained in the discharged liquid was measured, and breakthrough curves for the respective pieces were obtained from the results of the measurement.

Figure 4:
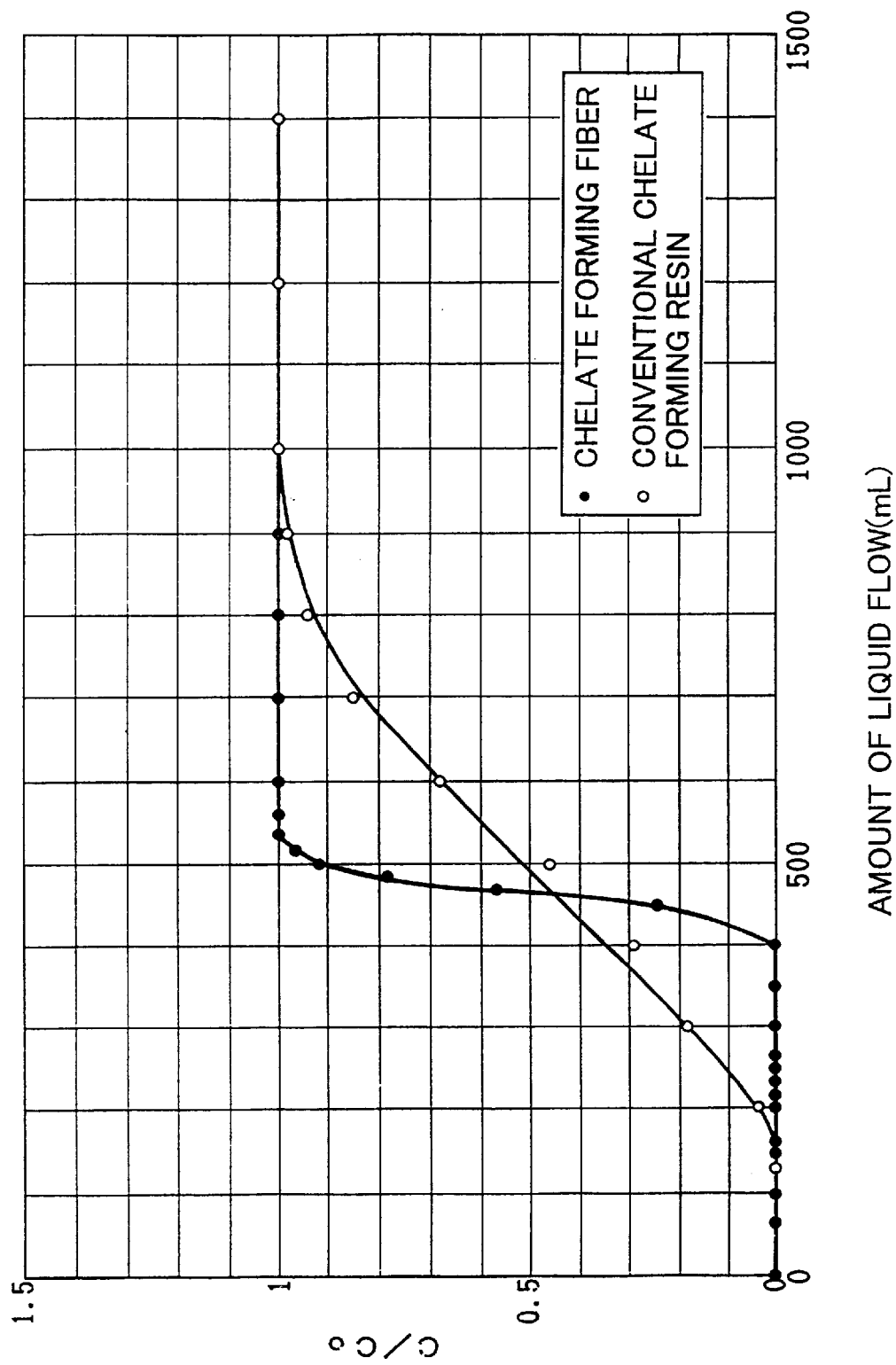
FIG. 4 is a graph illustrating the breakthrough curves of copper ion adsorption in the case of using the chelate forming fiber of the present invention and in the case of using a conventional bead-like chelate forming resin respectively for comparison therebetween.

As known from the results shown in FIG. 4, in the case of using the bead-like chelate forming resin, the copper ions were discharged before being sufficiently captured by the bead-like chelating resin. Contrary to this, in the case of using the chelate forming fiber of the present invention, the copper ions were substantially perfectly captured by the fiber until its metal ion capturing ability was saturated. From this result, it is found that the chelate forming fiber of the present invention has extremely high ability of capturing metal ions.

INDUSTRIAL APPLICABILITY

According to the present invention, the metal chelate forming fiber has lower pH dependency than conventional chelating resins. The metal chelate forming fiber has excellent adsorption activity at low pH and also in the case where it is used for treating waste water containing low metal ion concentration. In addition, the metal chelate forming fiber has excellent selective adsorption activity for metal ions. Through the use of the metal chelate forming fiber of the present invention, metal ions can be removed from waste water with high efficiency, whereas conventional ion-exchange resins and chelating resins cannot sufficiently remove metal ions from waste water. The liquid after treated with the metal chelate forming fiber is highly purified. In addition, the metal chelate forming fiber of the present invention is effective in capturing, collecting, and purifying valuable metals from various treated water.

The metal chelate forming fiber of the present invention has a number of chelate forming skeletons, each having the ability of capturing metal ion. Chelate forming skeletons are chemically bonded with the molecule in the surface of the fiber. In this state, the chelate forming skeleton is brought into contact with metal ions with high efficiency. Accordingly, improved adsorption and washing performance as well as higher elution speed are attained, as compared with the case of using conventional bead-like chelate forming resin. In addition, the fibrous shape of the metal chelate forming fiber is advantageous in many points. For example, when the chelate forming fiber is used as a disposable fiber without being recycled, it can be easily disposed by burning. In addition, the pressure loss of the fiber can be determined to an optimum value by adjusting its bulk density. When the fiber is made into the form of cartridge using a non-woven fiber or a cloth, works including the exchange of fiber can be conducted with high workability. The method for preparing the chelate forming fiber of the present invention requires no special equipment such as that using ionized radioactive ray, but only equipment for heating it in a polar solvent. The method is very simple and safe at low cost, and the resultant fiber has high performance. Therefore, the method of the present invention is very practical.

What is claimed is:

1. A metal chelate forming fiber comprising an acyl group represented by the following formula (1) as a substituent group covalently bonded to at least a molecule in a surface of the fiber, wherein the molecule is a constituent of the fiber:

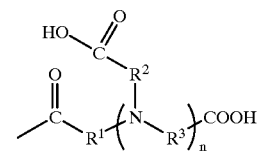

(1)

(wherein R$^1$, R$^2$, and R$^3$ respectively are a lower alkylene group, and n is an integer of 1 to 4).

2. A metal chelate forming fiber according to claim 1, wherein the acyl group represented by the formula (1) substitutes for a hydroxy group or an amino group present in the molecule in the surface of the fiber.

3. A metal chelate forming fiber according to claim 1, wherein the substitution rate of the acyl group obtained from the following mathematical expression is 10 weight percent or more:

substitution rate (weight percent)=((weight of the fiber after reaction—weight of the fiber before reaction)/weight of the fiber before reaction)*100.

4. A metal chelate forming fiber according to claim 2, wherein the substitution rate of the acyl group obtained from the following mathematical expression is 10 weight percent or more:

substitution rate (weight percent)=((weight of the fiber after reaction=weight of the fiber before reaction)/weight of the fiber before reaction)*100.

5. A metal chelate forming fiber according to claim 1, wherein the acyl group represented by the formula (1) is a residue of at least one molecule selected from the group consisting of nitrilotriacetic acid, ethylenediamine tetraacetic acid, and diethylenetriamine pentaacetic acid.

6. A metal chelate forming fiber according to claim 2, wherein the acyl group represented by the formula (1) is a residue of at least one molecule selected from the group consisting of nitrilotriacetic acid, ethylenediamine tetraacetic acid, and diethylenetriamine pentaacetic acid.

7. A metal chelate forming fiber according to claim 3, wherein the acyl group represented by the formula (1) is a residue of at least one molecule selected from the group consisting of nitrilotriacetic acid, ethylenediamine tetraacetic acid, and diethylenetriamine pentaacetic acid.

8. A metal ion sequestration method for capturing metal ions contained in water, comprising the step of using the metal chelate forming fiber comprising an acyl group represented by the formula (1) as a substituent group covalently bonded to at least a molecule in a surface of the fiber, wherein the molecule is a constituent of the fiber:

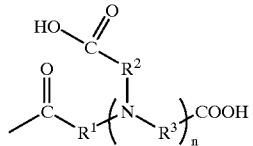
(1)

(wherein $R^1$, $R^2$, and $R^3$ respectively are a lower alkylene group, and n is an integer of 1 to 4).

9. A metal ion sequestration method according to claim 8, wherein the acyl group represented by the formula (1) substitutes for a hydroxy group or an amino group present in the molecule in the surface of the fiber.

10. A metal ion sequestration method according to claim 8, the substitution rate of the acyl group obtained from the following mathematical expression is 10 weight percent or more:

substitution rate (weight percent)=((weight of the fiber after reaction—weight of the fiber before reaction)/weight of the fiber before reaction)*100.

11. A metal ion sequestration method according to claim 8, wherein the substitution rate of the acyl group obtained from the following mathematical expression is 10 weight percent or more:

substitution rate (weight percent)=((weight of the fiber after reaction—weight of the fiber before reaction)/weight of the fiber before reaction)*100.

12. A method for preparing a metal chelate forming fiber, comprising the steps of: reacting an anhydride of a polycarboxylic acid represented by the following formula (2) directly with a reactive functional group in a molecule constituting the fiber to form a covalent bond, or introducing another reactive functional group into a molecule constituting the fiber and reacting the anhydride of the polycarboxylic acid represented by the following formula (2) with another reactive functional group to form a covalent bond:

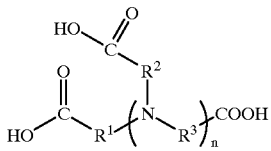
(2)

(wherein $R^1$, $R^2$, and $R^3$ respectively are a lower alkylene group, and n is an integer of 1 to 4).

13. A method for preparing the metal chelate forming fiber according to claim 12, wherein the anhydride of the polycarboxylic acid represented by the formula (2) is at least one molecule selected from the group consisting of nitrilotriacetic anhydride, ethylenediamine tetraacetic dianhydride, and diethylenetraimine pentaacetic diahydride.

* * * * *